F. CLERC.
MACHINE FOR SLICING FOOD STUFFS.
APPLICATION FILED DEC. 7, 1911.
1,026,495.
Patented May 14, 1912.
2 SHEETS—SHEET 1.
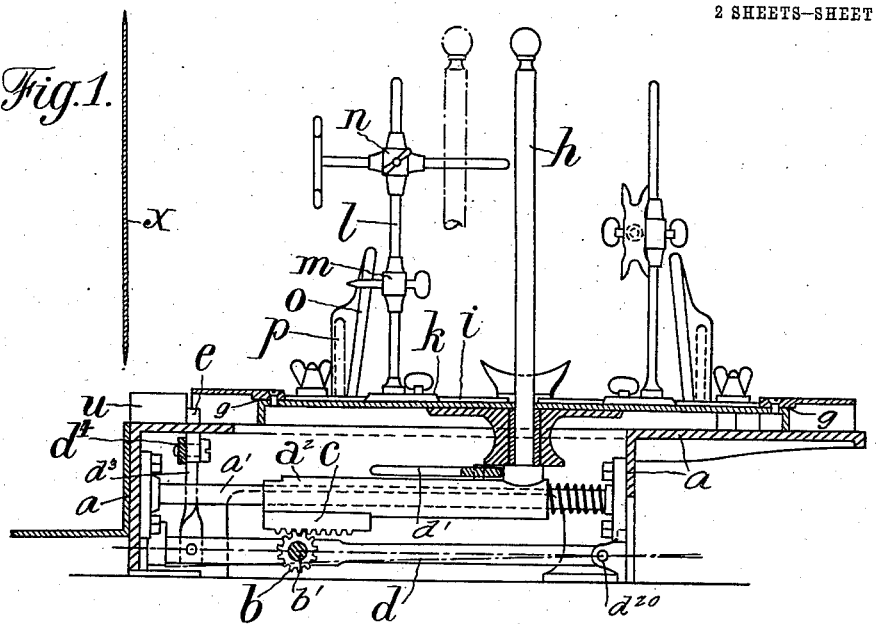
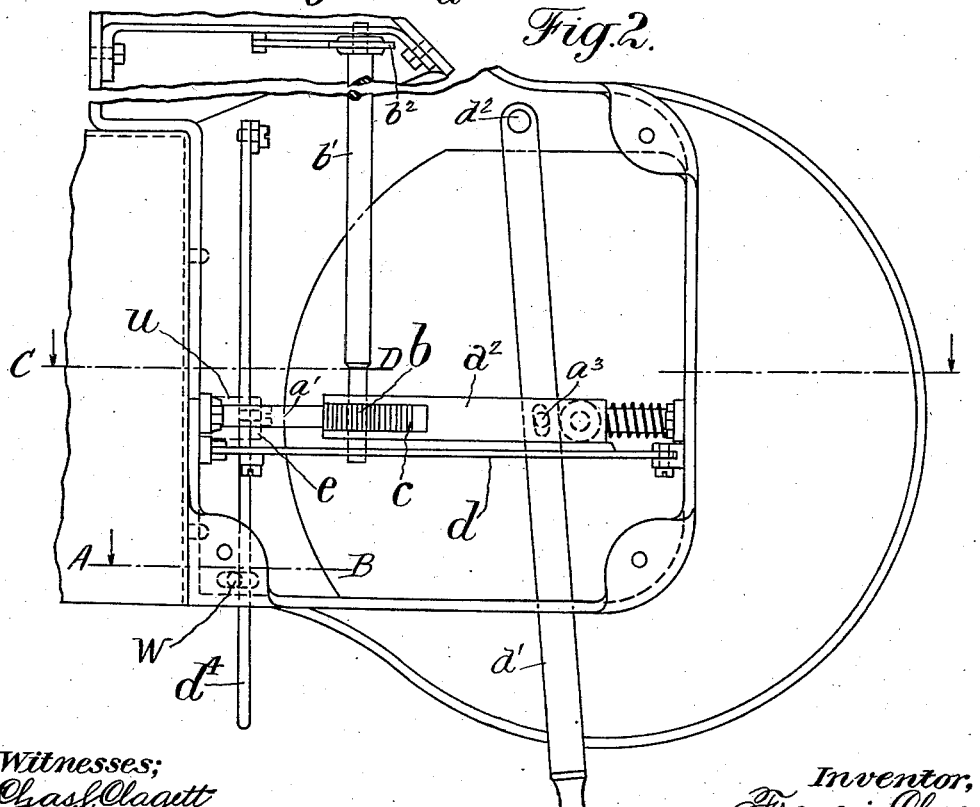
Witnesses:
Inventor,
François Clerc
By Harold Serrell
his Attorney.

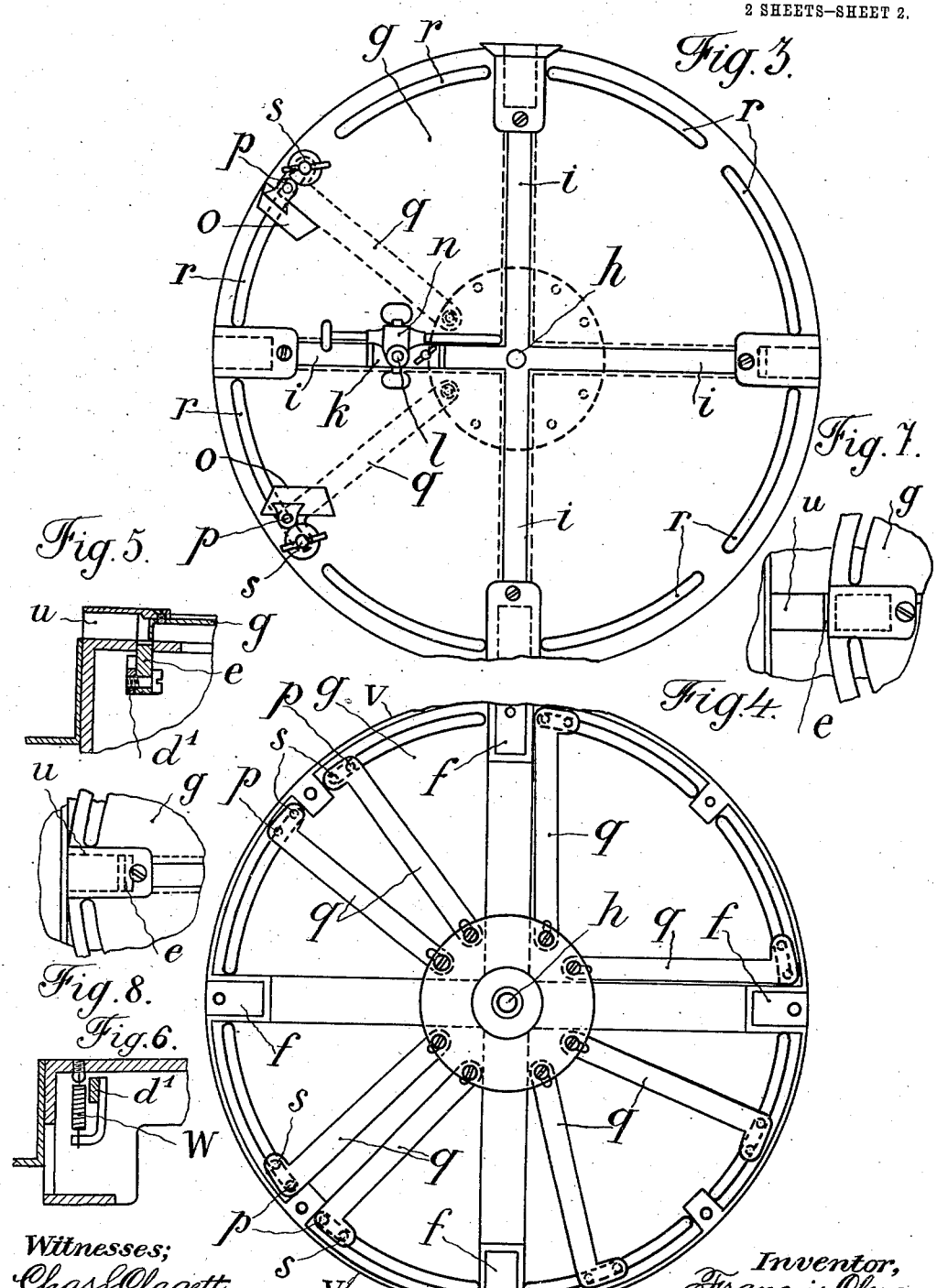

UNITED STATES PATENT OFFICE.

FRANÇOIS CLERC, OF GENEVA, SWITZERLAND, ASSIGNOR TO THE FIRM KUSTNER FRÈRES, OF VOLLANDES-GENEVA, SWITZERLAND.

MACHINE FOR SLICING FOODSTUFFS.

1,026,495.   Specification of Letters Patent.   Patented May 14, 1912.

Application filed December 7, 1911. Serial No. 664,472.

*To all whom it may concern:*

Be it known that I, FRANÇOIS CLERC, pork-butcher, a citizen of France, residing at Geneva, Canton of Geneva, in the Confederation of Switzerland, have invented certain new and useful Improvements in Machines for Slicing Foodstuffs, of which the following is a specification.

The present invention relates to certain improvements in cutting and slicing machines of the class used for food stuffs, such as cheese, bread, and the like, and in which a cutting disk is employed.

The invention consists of an improved device for holding and feeding the material to be cut and this is obtained by suitable means as used in revolving lathes and similar machine tools. The said device is formed of a disk or plate intended to be placed on the cutting machine in front of the cutting disk and to be connected to the device intended to feed to the cutting disk the material to be cut by means of a stud or pivot on which the said disk or plate may be rotated. The said disk or plate is provided with suitable ribs or grooves extending radially from the stud or pivot and intended to guide suitable holders of the material to be cut.

In the accompanying drawings, Figure 1 is a sectional elevation showing those portions of a cutting machine which comprise my invention. The cutting disk of the machine is shown diagrammatically by a single line $x$. Fig. 2 is an inverted plan of the portions of the machine shown in Fig. 1. Fig. 3 is a plan and Fig. 4 an inverted plan of the rotatory disk or plate $g$. Fig. 5 is a sectional elevation on line A B, Fig. 2, showing the disk or plate $g$ rocked to the end of its stroke toward the cutting disk $x$. Fig. 6 is a vertical section on line C—D of Fig. 2, showing a portion of the machine. Fig. 7 is a plan of a portion of the machine showing the guiding-block in the position in which it is shown in Fig. 1. Fig. 8 is a similar plan showing the said block in the position in which it is shown in Fig. 5.

In the drawings, $a$ is the base or casing of the machine to which is fixed a shaft $a^1$ carrying a sleeve $a^2$ intended to be shifted to-and-fro on the said shaft $a^1$. The sleeve $a^2$ carries a vertical pin or rod $h$ which acts as a pivot for the revolving disk or plate $g$, the said pin or rod $h$ and consequently the disk or plate $g$ are therefore shifted to-and-fro with the said sleeve $a^2$, so that these parts are alternately advanced toward the cutting disk $x$ and retracted from the same. The shifting of the sleeve $a^2$ on the shaft $a^1$ may be effected by means of a rocking hand-lever $d^1$, which is preferably rocked on its pivot $d^2$. The sleeve $a^2$ may be provided with a pin $a^3$ engaging a recess in the lever $d^1$, or I may employ a pinion $b$ gearing with a rack $c$ fixed on the said sleeve $a^2$. The shaft $b^1$ of the pinion $b$ is provided with a ratchet wheel $b^2$ which is adapted to be acted upon by any suitable pawl device whatever, in order to cause the sleeve $a^2$ to be advanced a predetermined distance (according to the thickness of the slices to be cut) each time the cutter $x$ be operated to cut one slice from the material.

In order that the sleeve $a^2$ may be shifted to-and-fro by means of the hand-lever $d^1$, it is necessary to temporarily disconnect the pinion $b$ from the rack $c$. This is done by having the end of the shaft $b^1$ pivoted to a rocking-lever $d$ which is pivotally connected at one end to the base $a$ of the machine at $d^{20}$ and at its other end to a hand-lever $d^4$ by means of a link $d^3$. The hand-lever $d^4$ carries a lock $e$ which by means of a spring $w$ is caused to engage one of the recesses $f$ provided in the lower face of the revolving disk or plate $g$ (see Figs. 4, 5 and 6). I also provide a guiding-block $u$ fixed to the base or casing of the machine and adapted to engage the said recesses $f$ of the revolving plate $g$.

In the construction of the invention as shown in the drawings the upper face of the revolving disk or plate $g$ is provided with four radial grooves $i$ each of which is intended to receive a slider $k$ as shown in one of them in Fig. 3. The said slider $k$ is provided with a stem $l$ to which there are fixed suitable holders $m$ and $n$ intended to engage and hold the material to be cut into slices. The said sliders $k$ may be fixed by means of suitable set screws in any desired position in the radial grooves $i$ and the holders $m$ and $n$ may be fixed at any suitable height upon the stem $l$, depending upon the nature of the piece of food stuff to be cut. The revolving disk or plate $g$ is further provided with pairs of jaws $o$ each of which is connected to a lever $q$ by means of a vertical pivot $p$. Each pivot $p$ is located in a segmental slot $r$ and each lever $q$ carries a screw $s$ adapted to slide in the same slot $r$ as the corresponding pivot $p$. Each screw $s$ is provided with a suitable clamp nut by means of which the corresponding lever $q$ and pivot $p$ may be fastened in the desired position on the disk or plate $g$. Each stem $l$ may hold one of four different materials to be cut into slices and the corresponding jaws $o$ are intended to prevent any lateral displacing of the same. Now when it is necessary to turn the disk or plate $g$, the lock $e$ is drawn out of the recess $f$, in which it happens to be, by depressing the hand-lever $d^4$. This done, the disk or plate $g$ may be turned into the desired position in which the material to be cut into slices is placed in front of the cutter $x$. Then the sleeve $a^2$ is then shifted, by means of the hand-lever $d^1$ toward the cutter $x$, until the food stuff to be cut comes into contact with the said cutter $x$.

The cutter is actuated by any well-known combination of gearings which also operates the ratchet device $b^2$; and by means of the pinion $b$ and rack $c$, the piece of material which is to be cut into slices is then automatically fed toward the cutter $x$. The revolving disk or plate $g$ may of course be provided with more or less than four radial grooves $i$ with sliders $k$, according to the number of different materials which are to be cut into slices by the machine. The grooves $i$ might be replaced by suitable ribs or projections intended to support changes of any construction whatever, intended to catch and hold the material to be cut to slices.

I claim as my invention:

1. A cutting and slicing machine, in which a cutting disk is employed, comprising a base, a support disk, means for automatically moving the support disk to bring the food stuff thereon up to the cutter, and means for automatically feeding the support disk after the food stuff thereon has been brought up to the cutter.

2. A cutting and slicing machine, in which a cutting disk is employed, comprising a revoluble support disk, means for moving the same up to the cutter, means for then automatically feeding the support disk a predetermined distance every time the cutter is actuated, and means for locking the support disk into position and simultaneously rendering the last aforesaid means operative.

3. A cutting and slicing machine, in which a cutting disk is employed, comprising a base, a revoluble disk, a shaft secured to the base, a sleeve on the said shaft, means for connecting and supporting the said disk to and upon the said sleeve, means for sliding the said sleeve on the said shaft for bringing the food stuff on the disk up to the cutter, and means operative, when the disk is in the last aforesaid position, for feeding the same a predetermined distance every time the cutter is actuated.

4. A cutting and slicing machine, in which a cutting disk is employed, comprising a base, a revoluble disk, a shaft secured to the base, a sleeve on the said shaft, means for connecting and supporting the said disk to and upon the said sleeve, a rack on said sleeve, an auxiliary shaft, a pinion on the auxiliary shaft adapted to engage said rack, and means whereby the pinion is rotated to move the sleeve and feed the disk by a step-by-step movement up to the cutter.

5. A cutting and slicing machine, in which a cutting disk is employed, comprising a base, a revoluble disk, a shaft secured to the base, a sleeve on the said shaft, means for connecting and supporting the said disk to and upon the said sleeve, a rack on said sleeve, an auxiliary shaft, a pinion on the auxiliary shaft adapted to engage said rack, means for disengaging the said pinion and rack so that the sleeve may be operated by the aforesaid means for actuating the same, and means whereby the pinion is rotated to move the sleeve and feed the disk by a step-by-step movement up to the cutter.

6. A cutting and slicing machine, in which a cutting disk is employed, comprising a base, a revoluble disk, a shaft secured to the base, a sleeve on the said shaft, means for connecting and supporting the said disk to and upon the said sleeve, a rack on said sleeve, an auxiliary shaft, a pinion on the auxiliary shaft adapted to engage said rack, means for disengaging the said pinion and rack so that the sleeve may be operated by the aforesaid means for actuating the same, means for locking the disk in position when the said pinion is in engagement with the said rack, and means whereby the pinion is rotated to move the sleeve and feed the disk by a step-by-step movement up to the cutter.

7. A cutting and slicing machine, in which a cutting disk is employed, comprising a base, a revoluble support disk, the said disk being provided with a number of radial grooves, a slider in each of said grooves, a stem or rod on each slider, adjustable clamps secured on the said stems, means for automatically moving the support disk to bring the food stuff thereon up to the cutter, and means for automatically feeding the support disk after the food stuff thereon has been brought up to the cutter.

8. A cutting and slicing machine, in which a cutting disk is employed, comprising a base, a support disk, the said disk having segmental slots, jaws in pairs, means for securing the same in any desired portion of the said slots, means for automatically moving the support disk to bring the food stuff thereon up to the cutter, and means for automatically feeding the support disk after the food stuff thereon has been brought up to the cutter.

In testimony whereof I have affixed my signature in presence of two witnesses.

FRANÇOIS CLERC.

Witnesses:
  G. SMER,
  W. SMER.

---

Copies of this patent may be obtained for five cents each, by addressing the "Commissioner of Patents, Washington, D. C."